Dec. 1, 1959  M. I. JAFFE  2,915,187

POROUS METAL FILTER

Filed Feb. 6, 1956

INVENTOR.
Myron I. Jaffe
BY Ezekiel Wolf
his Attorney

2,915,187
POROUS METAL FILTER

Myron I. Jaffe, Newton, Mass.

Application February 6, 1956, Serial No. 563,599

1 Claim. (Cl. 210—446)

The present invention relates to a porous metal filter fitting particularly adapted for use on liquid or gas fed fuels and to the combination of a liquid or gas fuel operated torch and filter fitting.

The present invention provides a filter incorporated into a fitting which is removably secured between a liquid or gas fuel line and torch. The filter elements function both as a filter, to prevent the passage of foreign matter towards the nozzle from the supply source, and in addition acts as a flashback preventer.

Torches ordinarily used for cutting metal and the like, such as oxyacetylene or oxygasoline torches are carefully supplied from a fuel tank directly through a hose line. Occasionally, dirt filters have been positioned near the tank to prevent the passage of contaminants into the torch valves and tips. However, because of the bulk of these filters, they have not been particularly adapted for attachment near the nozzle of the torch, nor have these filters acted to prevent flash backs from the torch nozzle. Thus it is an object of the present invention to provide a structure in which the torch is provided with a small and compact filter directly connected to the end of the torch. This filter unit and torch combination is designed to prevent accidental flash backs in which the flame travels up the hose line toward the fuel tank, and further is designed to provide a sturdy and rugged construction able to withstand the abuse to which these units are normally subjected.

A further object of the present invention is to provide a filter fitting adapted to be inserted between a hose line and torch of the ordinary oxyacetylene type or similar type, without the requirement of adapters or additional fittings. This unit may be secured in place with an ordinary wrench, and may, in the event of clogging, or the occurrence of other defects be readily removed for cleaning or replacement. These and other objects of the present invention will be more clearly understood when considered in connection with the accompanying drawings, in which.

Figure 1:
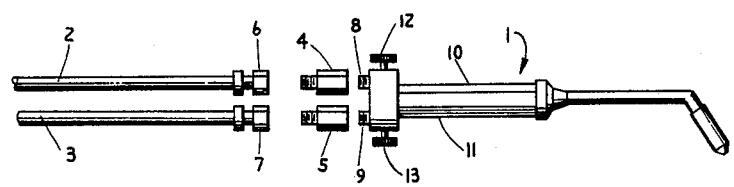
Figure 1 illustrates a plan exploded view of the invention as utilized in connection with a torch of the acetylene type.

The present invention has been designed primarily for preventing flash back fires or explosions, as well as for filtering purposes in torches, utilizing liquid or gaseous fuels, normally supplied to the torch nozzle through one or more hose lines. The usual oxy acetylene torch or oxygasoline torch is typical of this type of structure. As these torches must be of light weight and easily removable, it is quite important that the filter structure be of small size and weight and easily adapted to fit into the lines of the torch so as to provide no bulky, obstructing projection which might interfere with proper handling of the unit. Thus, as illustrated in Figure 1, there is shown the novel combination of the present invention as embodied in an oxyacetylene torch having a nozzle unit 1 and a pair of hose lines 2 and 3 provided to convey oxygen and acetylene gases to the nozzle tip 1. The gases and oxygen are conveyed through the hose lines 2 and 3 from their respective tanks to the filter fittings 4 and 5 respectively. These fittings interconnect the hose coupling nuts 6 and 7, and the threaded nipples or shanks 8 and 9 respectively. These threaded nipples 8 and 9 provide passages to a tubular conduits 10 and 11 respectively, through the valve controls 12 and 13, respectively.

Figure 2:
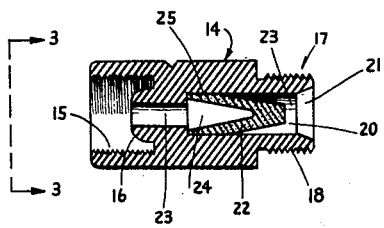
Figure 2 illustrates a cross section of the filter fitting.
Figure 3:
Figure 3, illustrates an end view of the filter fitting taken from the left side of Figure 2.

These filter fittings 4 and 5 are of identical structure which is shown more clearly in large cross sections in Figure 2 and in an end view in Figure 3. In this structure, the body 14 of the unit is provided with a female and having a threaded recess 15 adapted to fit over and be tightened on the threaded nipples 8 or 9. At the bottom of the recess 15, is a projecting boss 16, shaped to fit the inside of the nipples 8 and 9 in order to provide a secure and air-tight fitting. The male end 17, of this structure has a threaded outer nipple 18, adapted to be screwed into either of the connectioning nuts 6 or 7, positioned at the end of the hose lines 2 and 3, to form an airtight fit. The recess 20 provided at the male end of the fitting, has an outwardly flared end 21, and a longitudinal inner section of preferably even diameter, within which the sintered metal filter 22 is positioned. This sintered metal filter 22 is generally conical in shape with a flattened top section 23 and a conical recess 24 formed in a base. The sides of this filter 22 are bevelled at 25 to conform to the side walls of the recess 20. This filter 22 is force fit into the recess 20 and is secured in position at the base of this recess over the passageway 26 by a heat fusing process utilizing conventional methods.

Although the cone shape is preferable, and obtains improved results, a filtered disc has also been successfully utilized in the operation of this invention. The particular type of sintered metal filter may be varied depending upon the materials used as fuel and upon the type of contaminants usually encountered. Thus for lighter and more easily filterable fluids or gases, a denser sintered metal is utilized in the manufacture of the cone section.

It should be noted that the filter fitting is readily removable and because of the cone shape of the filter, is easily cleaned or washed, by blowing in reverse a jet of air or solvent through the filter. It should also be noted that because of the cone shape of the filter, it may readily be used for a substantial length of time during which contaminants collect about the core. It thereby provides a greatly increased surface area through which the fluids may be filtered. It should also be noted in the present invention, that the constricted passage 23, acts together with the conical filter section to provide a substantial deterrent and flame proof barrier through which the flash back cannot normally occur.

It should be understood that although my invention is described in connection with a specific type of torch, it is adapted to any type of torch utilizing liquid or gaseous fuels, which are supplied to the torch nozzle through lengths of hose lines connected by a male and female threaded coupling directly to the nozzle.

Having now described my invention, I claim:

In the combination of a torch of the metal cutting variety having a fuel supplying hose and a torch nozzle, a fitting interconnecting said hose and nozzle comprising a body having a female end with an internally threaded recess adapted to engage the nozzle, an externally threaded male end with a recess formed therein of smaller diameter than said first mentioned recess adapted to engage said hose, means forming a passage between and of smaller diameter than said recesses whereby shoulders are formed at the base of either recess, a hollow conical filter of porous metal fitted in said male end recess and tapering toward the open end of said male end with its base positioned against one of said shoulders, said filter having an outer peripheral side wall of uniform diameter at its base with said sidewall fitted to the wall forming the male end recess adjacent said last mentioned shoulder, said filter sidewall and base being fused to said male end sidewall and last mentioned shoulder respectively.

References Cited in the file of this patent

UNITED STATES PATENTS

| | | |
|---|---|---|
| 713,421 | Fouche | Nov. 11, 1902 |
| 1,214,055 | Messer | Jan. 30, 1917 |
| 2,068,858 | Jones | Jan. 26, 1937 |
| 2,421,329 | Hoffer | May 27, 1947 |
| 2,604,958 | Leufvenus | July 29, 1952 |